United States Patent [19]

Ohlsson

[11] 4,208,034
[45] Jun. 17, 1980

[54] QUICK-COUPLING ASSEMBLY FOR FLUID CONDUITS

[76] Inventor: Weimar Ohlsson, Surte, Sweden

[21] Appl. No.: 909,053

[22] Filed: May 24, 1978

[30] Foreign Application Priority Data

May 25, 1977 [SE] Sweden .................................. 7706096
May 10, 1978 [SE] Sweden .................................. 7805297

[51] Int. Cl.² ............................................. F16K 37/28
[52] U.S. Cl. .................................. 251/149.1; 285/308
[58] Field of Search ...................... 251/149.1, 149.8; 285/308, 314, 315, 319

[56] References Cited

U.S. PATENT DOCUMENTS

| 3,588,149 | 6/1971 | Demler, et al. .................. 285/307 X |
| 3,684,321 | 9/1972 | Hundhausen ...................... 285/319 X |
| 3,887,222 | 6/1975 | Hammond .......................... 285/307 |

Primary Examiner—William R. Cline
Attorney, Agent, or Firm—Holman & Stern

[57] ABSTRACT

An improved quick-coupling assembly for fluid conduits comprising a first sleeve portion, which is connected to a first conduit and at its free end is slotted thus forming a number of resilient tongues and a second sleeve portion, which is connected to a second conduit and in which a part of the first sleeve portion is intended to be received. For locking the two sleeve portions together an external collar is provided on the resilient tongues of the first portion, said collar being intended to be locked behind an interior shoulder in the second portion. When the coupling is to be disconnected, the first portion is pushed further inwardly in the second portion, at which a ring having a substantially triangular cross-section and being arranged in and being axially displaceable in the second portion cooperates with the resilient tongues compressing them, so that the collar can be moved past the shoulder when the first portion is pulled outwardly.

8 Claims, 6 Drawing Figures

QUICK-COUPLING ASSEMBLY FOR FLUID CONDUITS

BACKGROUND OF THE INVENTION

The present invention relates to a quick-coupling assembly for fluid conduits.

In a known quick-coupling assembly one of the coupling portions is provided with a number of balls with a certain mobility in a radial direction, said balls falling down into a groove on the outer side of the second coupling portion when the first coupling portion is passed over the other. The balls are kept in place in the groove by a casing which is pushed over the balls preventing these from leaving the groove. This assembly demands a close running fit and is relatively expensive to produce.

There is also a quick-coupling assembly previously known (US-PS Pat. No. 3,887,222), where a compressible lock ring is mounted on to the inner coupling portion, said lock ring being provided with a conical surface intended to cooperate with a cam ring restrictedly axially displaceable in the outer coupling portion. In a connected position the lock ring is to be fitted between the cam ring and a stop ring, and at the disconnection the cam ring is to cooperate with the conical surface of the lock ring, at which the lock ring is compressed, so that it can be moved past the stop ring. This earlier known assembly has several disadvantages. For one thing the assembling offers difficulties, as the different rings must be pressed into or on the coupling portions respectively. Furthermore, it is extremely questionable if it is possible to fit the lock ring between the cam ring and the stop ring, as the cam ring will be wedged onto the conical surface of the lock ring, when it is displaced to make contact with its stop surface, at which it is brought back by the lock ring when this is brought back, and thus the lock ring cannot slide into its locking position.

The purpose of the present invention is to provide a quick-coupling assembly in which connecting as well as disconnecting work in a simple and easy way. Besides this the quick-coupling assembly should be easy to produce and install.

SUMMARY OF THE INVENTION

This has been achieved by a quick-coupling assembly comprising a first sleeve-like portion which at one end is provided with a number of resilient tongues which, for connection with a second sleeve-like portion, are intended to be locked with at least one collar behind at least one shoulder or the like in the second portion, and a ring in the second portion axially displaceable towards and from the shoulder, said ring being designed to cooperate with the tongues and thus compress these, so that they can be moved past the shoulder.

BRIEF DESCRIPTION OF THE DRAWINGS

The invention will be more closely described below with reference to a couple of embodiments illustrated on the enclosed drawings.

DESCRIPTION OF SOME PREFERRED EMBODIMENTS OF THE INVENTION

Figure 1:
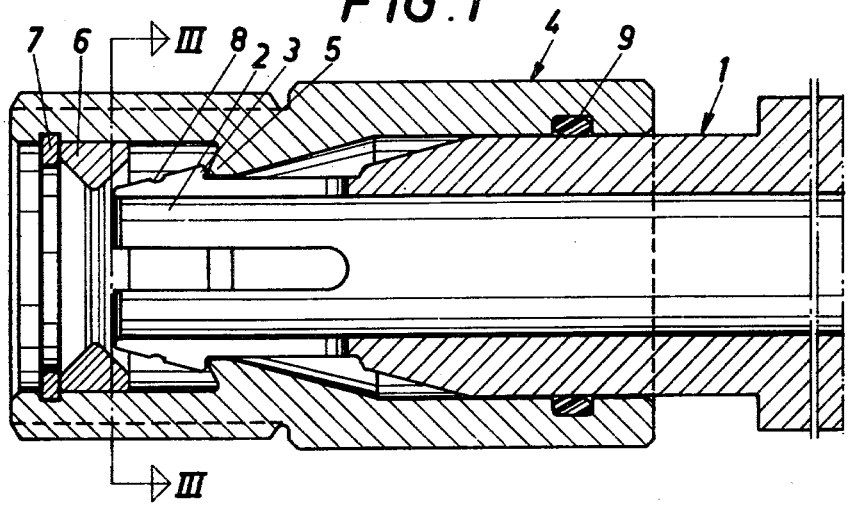
FIG. 1 is a longitudinal section through the coupling assembly according to the invention, showing said assembly in a connected position.

The quick-coupling assembly comprises a first sleeve-like portion 1, e.g. intended to be connected to a flexible tube or the like. The first portion 1 is at its free end slit open so that four resilient tongues 2 are formed. Each tongue 2 has a collar 3. A second sleeve-like portion 4, which can be designed to be connected to a water tap or the like, is inwardly provided with a circumferential shoulder 5, behind which the collars 3 of the tongues 2 are intended to be locked for connecting of the first and second portions 1 and 4, respectively.

The second portion 4 is, at some distance behind the shoulder 5 provided with a ring 6, essentially triangular in cross-section, said ring being displaceable in an axial direction in the second portion 4 between the shoulder 5 and a circumferential flange 7. The ring 6 is with its point intended to cooperate with the tongues 2 in order to compress these, so that they can be moved past the shoulder 5. Thus the point of the ring 6 engages into a groove 8 arranged on the outside of the tongues 2.

The tongues 2 are outwardly provided with a conicity decreasing from the collar 3 towards the free end, in order to admit cooperation with the shoulder 5 and the ring 6.

The slit-open part of the first portion 1 shows less thickness of material than the non-slit part of the first portion, said non-slit part with its outer side partly intended to make contact with the inside of the second portion 4. The second portion 4 is provided with a seal 9, intended to make a sealing contact with the first portion 1.

Figure 2:
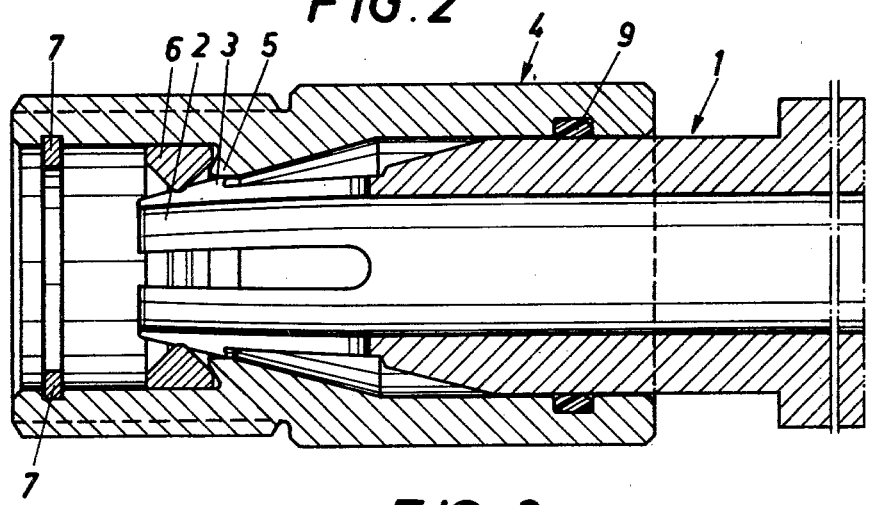
FIG. 2 is a longitudinal section corresponding to FIG. 1, but showing the coupling assembly in the disconnecting position.

The quick coupling assembly works in the following way:

The first portion 1 is introduced into the second portion 4. When the tongues 2 reach the shoulder 5 they are somewhat compressed so that they can pass the shoulder 5, and when the collars 3 of the tongues 2 have been moved past the shoulder 5 they are locked behind said shoulder, and so the two portions 1 and 4 are connected. When it is desired to disconnect the portions 1 and 4 the first portion 1 is moved further into the second portion 4, at which the ends of the tongues 2 bring the displaceable ring 6 to make contact with the flange 7. When the first portion 1 is moved further into the second portion 4 the point of the ring 6 cooperate with the conical upper side of the tongues 2, thus compressing the tongues 2. When the point of the ring 6 reaches the groove 8 it engages into said groove and so the ring 6 and the tongues 2 are connected. Then the ring 6 is brought along by the first portion 1, when this is moved out of the second portion 4. The tongues 2 are kept compressed enough to move the collars 3 past the shoulder 5, as shown in FIG. 2. When the ring 6 reaches the position illustrated in FIG. 2 its further movement is stopped by the shoulder 5 and the point of the ring 6 is then disengaged from the groove 8 in the tongues 2, so that the first portion 1 can be completely moved out of the second portion 4.

To prevent that the first portion 1, when connected to the second portion, is by mistake moved past the locking position according to FIG. 1 and to a connecting position with the ring 6, the points of the tongues 2 are in locking position located essentially right in front of the point of the ring 6, at which said points knock against each other when the first portion 1 is moved past the locking position, what is thereby indicated for the person who makes the connection.

Figure 4:
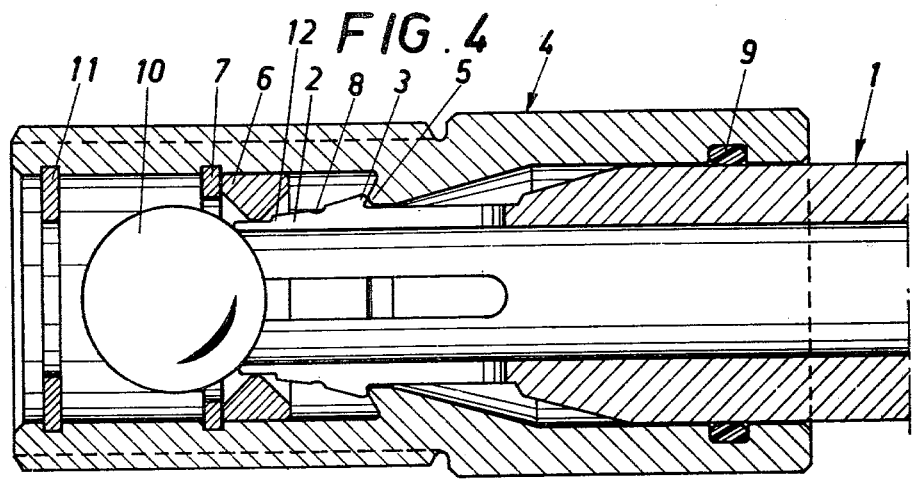
FIG. 4 is a longitudinal section through another embodiment of the coupling assembly showing this in a connected position and completed with a stop valve.
Figure 5:
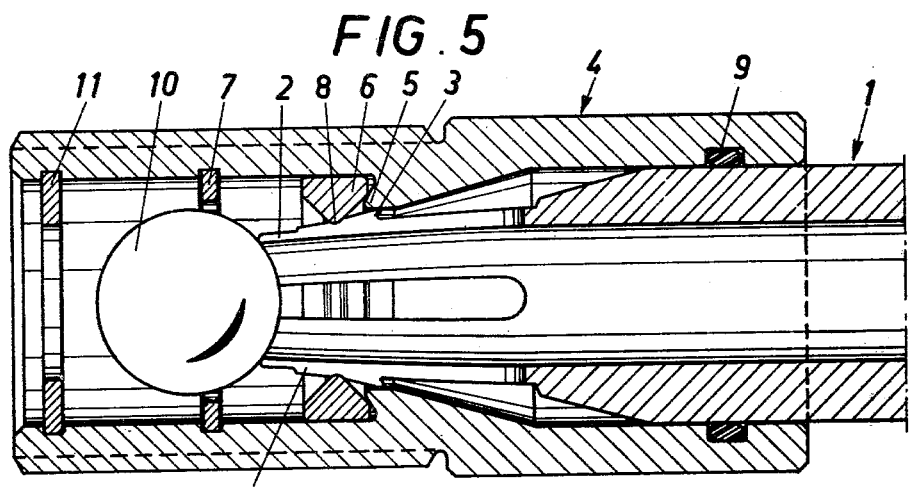
FIG. 5 is a longitudinal section equivalent to FIG. 4 but showing the coupling assembly in the disconnecting position.
Figure 6:
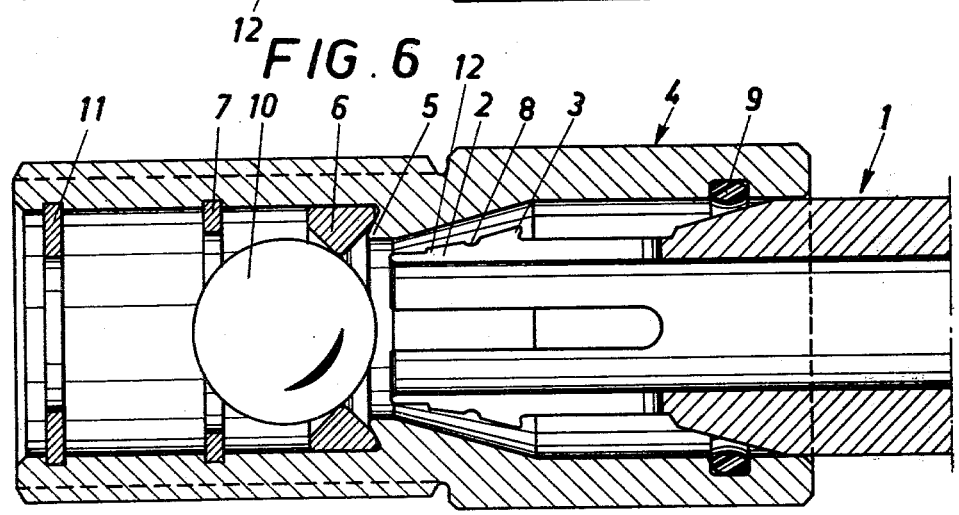
FIG. 6 is a longitudinal section showing the coupling assembly according to FIGS. 4 and 5 in a disconnected position where the stop valve has started to work.

In the embodiment according to FIGS. 4–6 the quick coupling assembly is provided with a stop valve, which starts working when the two sleeve-like portions are disconnected. Then the quantity of fluid present in the second tube between the shut-down device and the quick coupling assembly is prevented from flowing out, what otherwise would be the case. As the distance between the shut-down device and the quick-coupling assembly can sometimes be large, several meters, it can thus be a question of considerable quantities of fluid, e.g. expensive oil being lost in this way, not to mention the invonviniences which may be caused by the out-flowing fluid. Of course a free passage for the fluid is to be guaranteed in the connected position of the two portions.

In the second portion 4, inside the ring 6, there is arranged a valve body for example a ball 10, which can move between the ring 6 and a stop ring 11 arranged at a distance from said ring 6. In the connected position of the portions 1 and 4 according to FIG. 4 the ball 10 is kept at a distance from the ring 6 by the resilient tongues 2, while it in the disconnected position of the portions 1 and 4 according to FIG. 6 is pressed to a sealing contact with the ring 6 by the fluid pressure, thereby preventing the fluid from leaking out.

To prevent that the first portion 1, when connected with the second portion 2, is by mistake inserted to far into and past the connecting position according to FIG. 1, there is arranged a shoulder 12 outside the tongue 2 in front of the groove 8, said shoulder being arranged to knock against the point of the ring 6 to indicate that the portion 1 has now been moved past the connection position.

Figure 3:
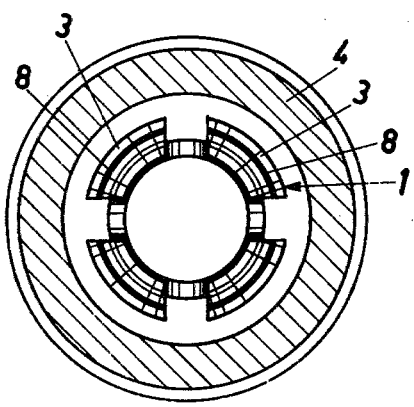
FIG. 3 is a section according to the line III—III in FIG. 1.

The disconnection of the two portions 1 and 4 is done in the same way as described above under FIG. 1–3.

A further advantage of the assembly according to FIGS. 4–6 is that at a sudden pressure drop for example as a consequence of a tube break, the ring 6 will work as a piston and move on the tongues 2 until its point engages into the groove 8, at which the quick-coupling is disconnected and the stop valve can start working, that is the ball 10 is pressed to make a sealing contact with the ring 6. This requires a soft resiliency of the tongues 2.

The invention is of course not limited to the shown embodiment but can be varied in the scope of the claims. Thus each tongue can have more than one collar and the second sleeve-like portion 4 can be designed with several circumferential shoulders.

What I claim is:

1. A quick-coupling assembly for connecting a pair of conduits in fluid communication, said assembly comprising a first sleeve-like coupling member, means at one end of said first coupling member for connection to one of the conduits, a second sleeve-like coupling member for receiving said first coupling member therein, means at one end of said second coupling member for connection to the other of said conduits, said first coupling member being formed with a plurality of axially extending resilient tongues at the end thereof remote from said one end, each tongue having an outwardly extending projection and an external surface portion tapered inwardly from said projection towards a free end of the tongue, said second coupling member having an internal inwardly extending locking shoulder for engaging behind said projections of said tongues when said first coupling member is received in said second coupling member in a locked first position of the assembly, said second coupling member further comprising an internal ring between said shoulder and said one end of the second coupling member, said ring having limited axial displacement from said shoulder towards said one end, said ring resiliently compressing said tongues upon movement of the first locking member axially inwardly of the second coupling member from said first position to a second position, and means for retaining said ring on said tongues during outward movement of said first coupling member from said second position to a third position in which the ring engages said locking shoulder whereby said projections of the tongues compressed by said ring can be moved to a position outwardly of said locking shoulder thus permitting further outward movement of the first coupling member from the second coupling member.

2. A quick-coupling assembly according to claim 1 wherein said ring has a substantially triangular cross-section with the apex thereof being radially inwardly orientated relative to the second coupling member.

3. A quick-coupling assembly according to claim 2 wherein said surface portion of each of said tongues has a groove for receiving the apex of said ring and retaining the ring on the tongues during movement of said first coupling member from said second to said third position.

4. A quick-coupling assembly according to claim 2 wherein the free ends of the tongues, in the locked first position of the assembly are located immediately adjacent the apex of said ring whereby a further inward movement of the first coupling member causes the free ends of the tongues to engage the apex of the ring.

5. A quick-coupling assembly according to claim 1 wherein the second coupling member includes a flange between said shoulder and said one end for limiting the movement of said ring.

6. A quick-coupling assembly according to claim 1 including a valve body in the second coupling member between said ring and said one end, said valve body in the disconnected condition of the coupling members sealingly contacting the ring and in the connected position of the coupling members being held in spaced relation from the ring by said resilient tongues of the first coupling member.

7. A quick-coupling assembly according to claim 6 including a stop ring in said second coupling member for limiting the movements of the valve body.

8. A quick-coupling assembly according to claim 6 wherein said surface portion of each of said tongues includes at least one shoulder.

* * * * *